United States Patent [19]

Powers

[11] Patent Number: 4,969,969
[45] Date of Patent: * Nov. 13, 1990

[54] APPARATUS AND METHOD FOR INFRARED SEALING OF PLASTIC STRAP

[75] Inventor: Robert T. Powers, Homewood, Ill.

[73] Assignee: The Interlake Companies, Inc., Oak Brook, Ill.

[*] Notice: The portion of the term of this patent subsequent to Mar. 6, 2007 has been disclaimed.

[21] Appl. No.: 336,910

[22] Filed: Apr. 12, 1989

Related U.S. Application Data

[63] Continuation-in-part of Ser. No. 182,160, Apr. 15, 1988, Pat. No. 4,906,320.

[51] Int. Cl.⁵ .............................................. B32B 31/24
[52] U.S. Cl. .............................. 156/275.1; 156/272.4; 156/379.8; 156/380.9; 156/499; 156/502; 156/522; 156/544
[58] Field of Search .................. 156/502, 156–158, 156/73.1, 272.2, 272.4, 275.1, 379.6, 379.8, 380.9, 499, 443, 389, 459, 497, 468, 522, 475, 583.1, 379.7, 538, 543, 544

[56] References Cited

U.S. PATENT DOCUMENTS

| | | |
|---|---|---|
| 3,247,041 | 4/1966 | Henderson . |
| 3,461,014 | 8/1969 | James . |
| 3,470,814 | 10/1969 | Tschappu ........................ 156/308.4 |
| 3,472,721 | 10/1969 | Abramson et al. . |
| 3,549,451 | 12/1970 | Kugler . |
| 3,614,914 | 10/1971 | Troll . |
| 3,749,622 | 7/1973 | Sato et al. . |
| 3,804,691 | 4/1974 | Trivedi . |
| 4,156,626 | 5/1979 | Souder . |
| 4,220,493 | 9/1980 | Wehr et al. . |
| 4,228,270 | 9/1981 | Mossell et al. . |
| 4,420,352 | 12/1983 | Schroeder et al. . |
| 4,664,738 | 5/1987 | Tadros . |

FOREIGN PATENT DOCUMENTS 2103147 2/1983 United Kingdom .

OTHER PUBLICATIONS

Article by D. W. Dahringer and J. R. Schroff Entitled "Jar–Cover Seal", Copyright 1970 American Telephone and Telegraph Company, Reprinted from the Bell System Technical Journal, vol. 49, No. 7, Sep., 1970.

Primary Examiner—Merrell C. Cashion, Jr.
Attorney, Agent, or Firm—Emrich & Dithmar

[57] ABSTRACT

A portable system provides a high-strength joint between two portions of radiant energy transmitting thermoplastic strap having an opaque radiant energy absorbing area on one surface thereof, wherein the strap portions are overlapped so that the opaque area is at the interface therebetween. The overlapped strap portions are clamped at spaced-apart locations so that at least one strap portion is fixed. An arcuate anvil is then moved against the strap portions between the clamp locations for urging the strap portions together and deflecting them, thereby placing the fixed strap portion under tension. Infrared energy is directed through a free, uncontacted, outer surface area of the tensioned strap portion and onto the opaque area for melting the adjacent strap surfaces to form a joint. The clamps and anvil are manually operated. A manually operable cutter is provided for severing the tensioned strap portion from its supply after formation of the joint.

24 Claims, 4 Drawing Sheets

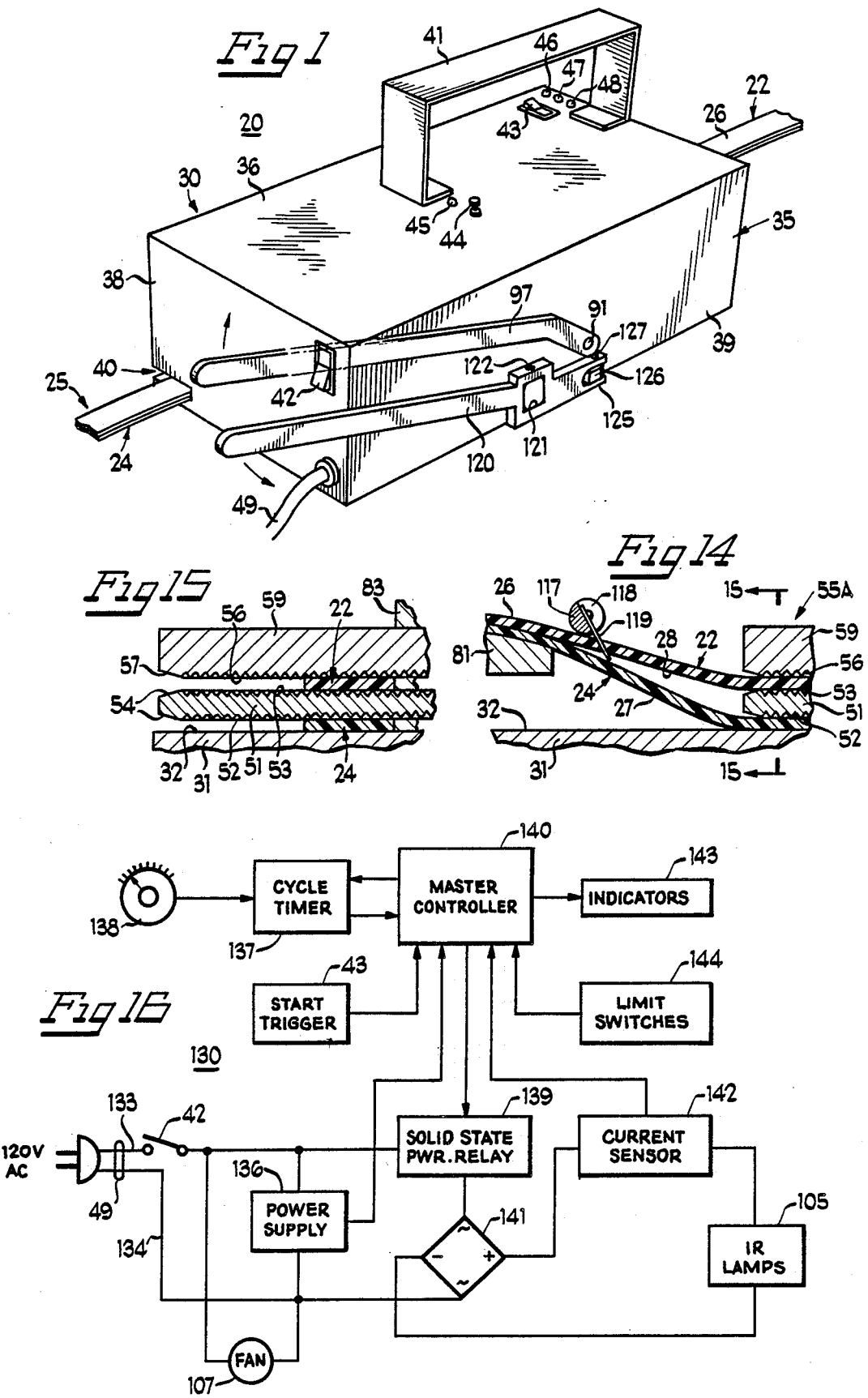

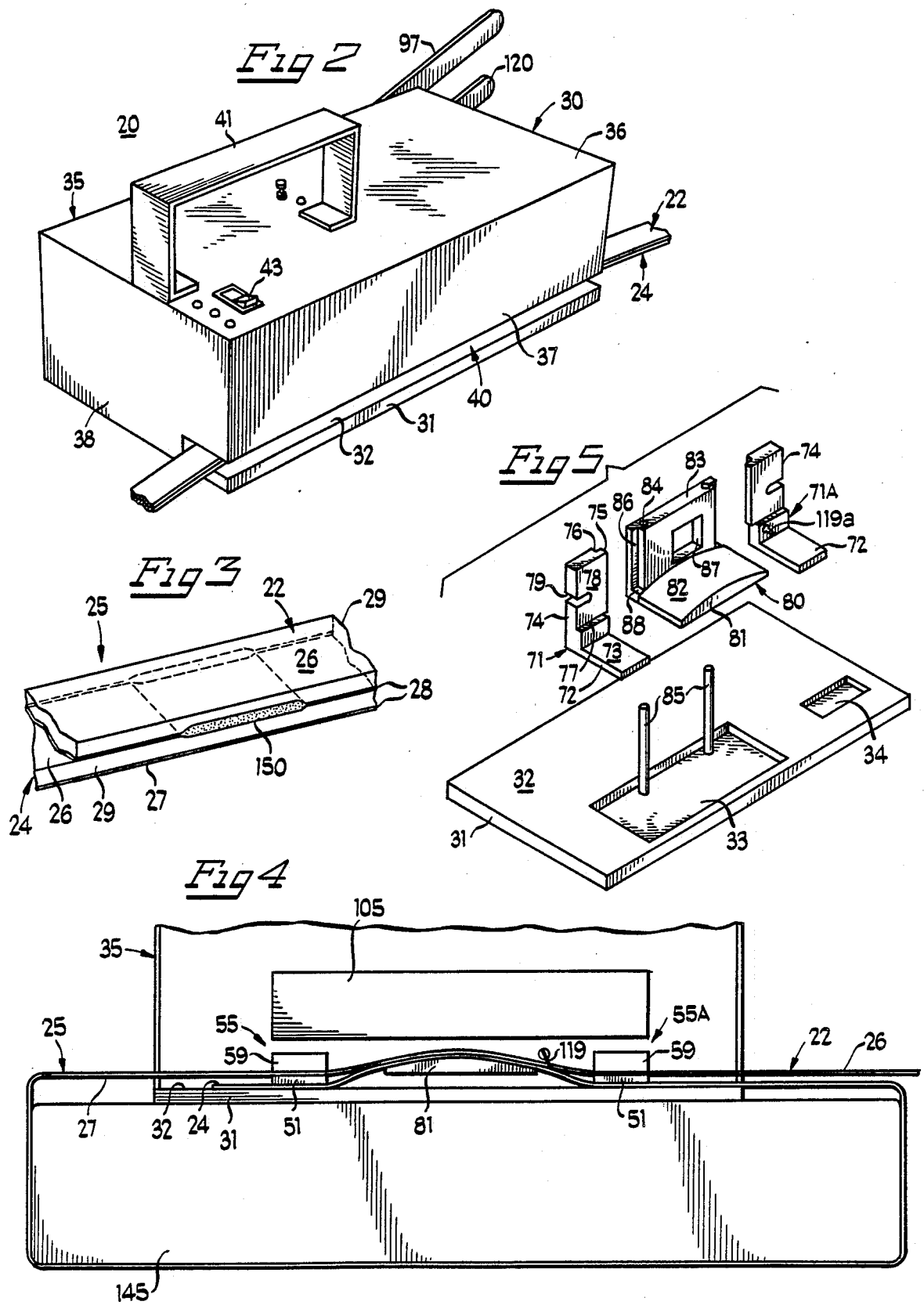

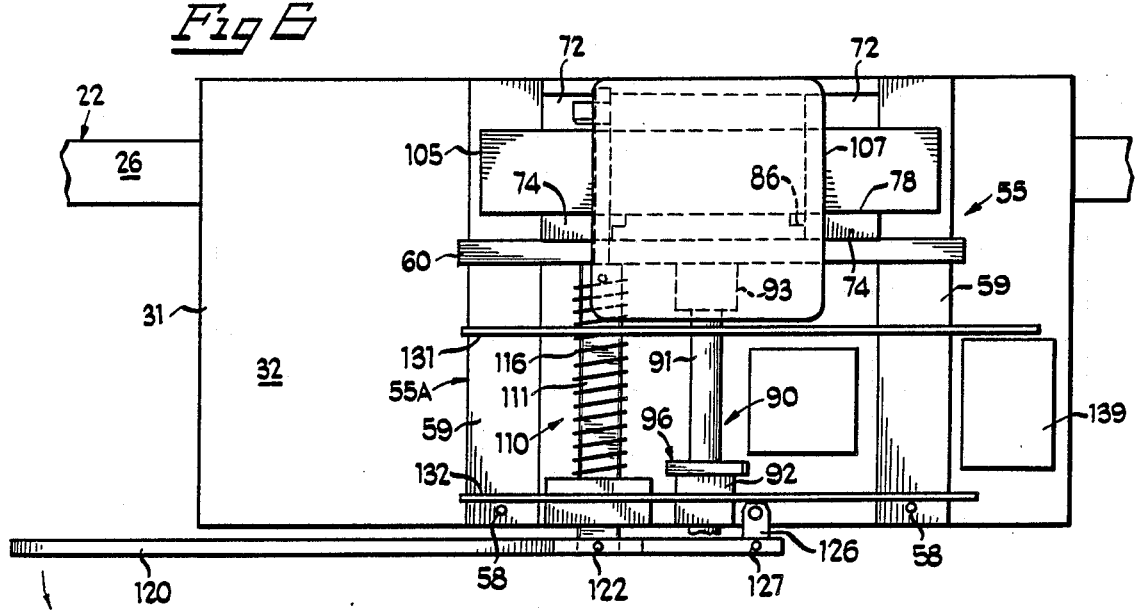
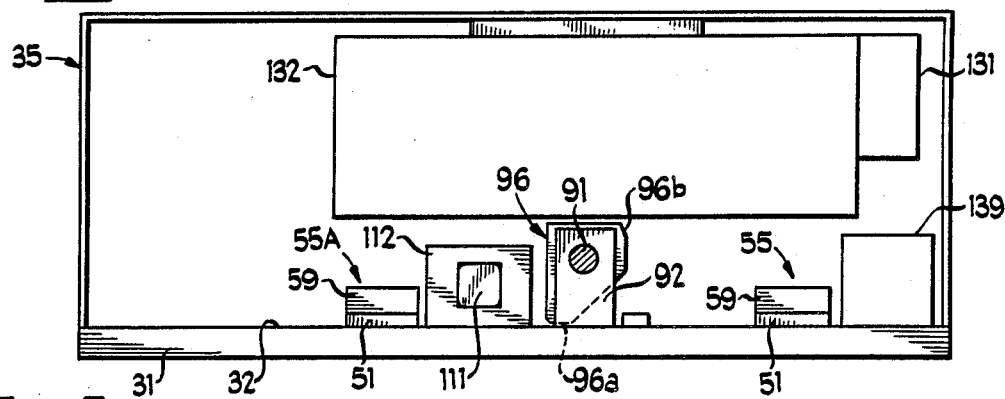
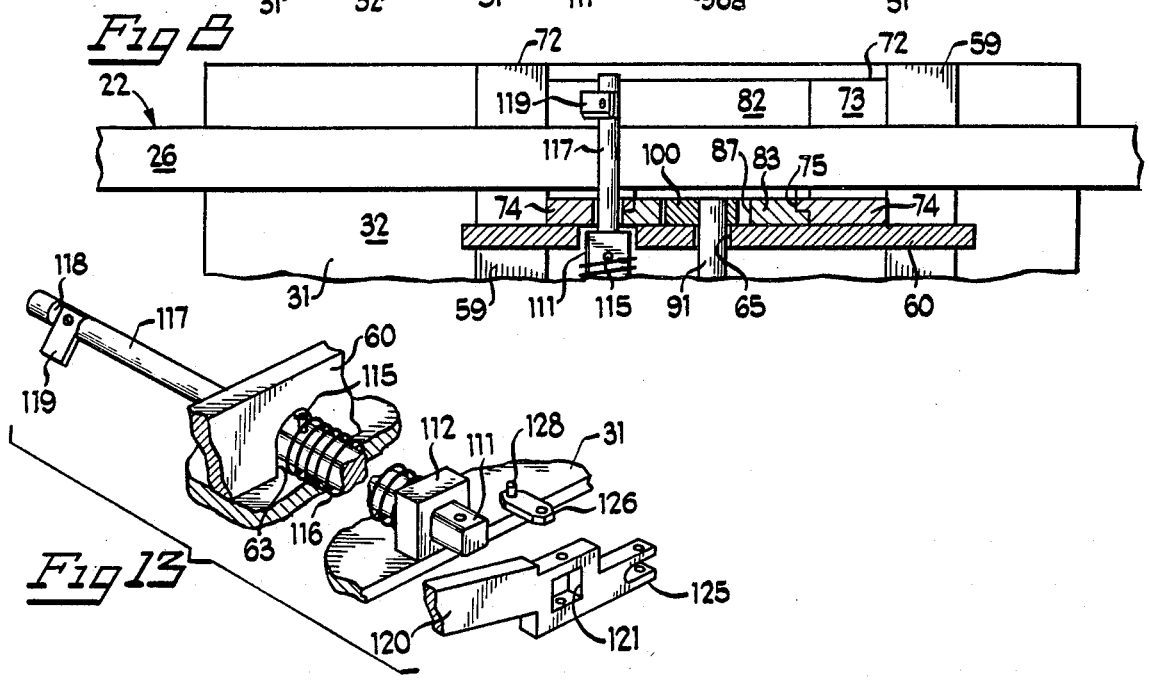

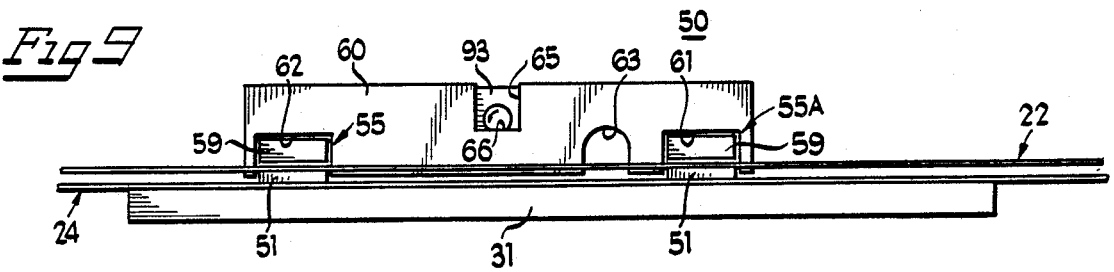
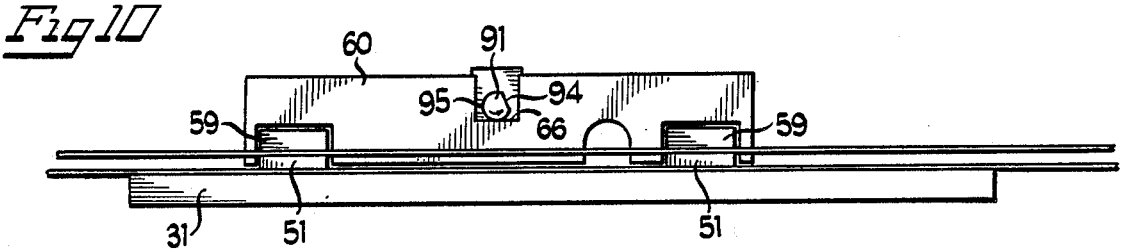
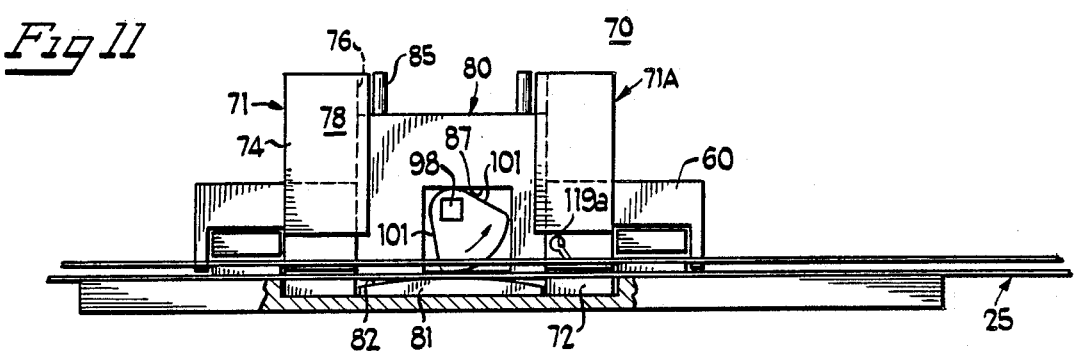
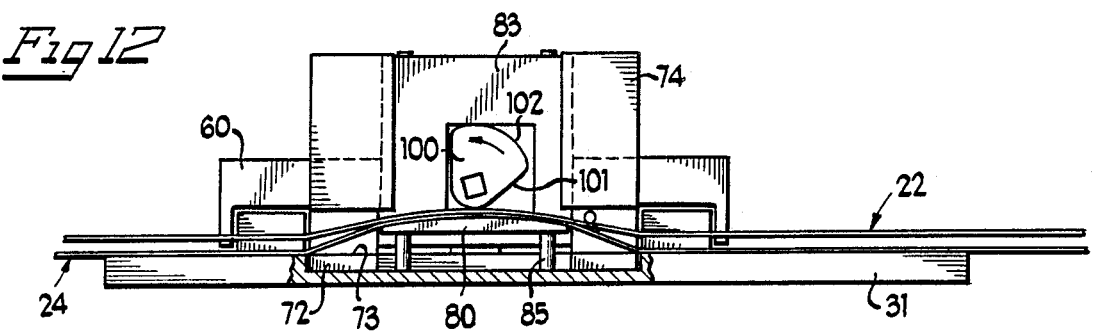

APPARATUS AND METHOD FOR INFRARED SEALING OF PLASTIC STRAP

CROSS-REFERENCE TO RELATED APPLICATION

This is a continuation-in-part of applicant's copending U.S. application Ser. No. 182,160, filed Apr. 15, 1988 and entitled "Apparatus and Method for Infrared Sealing of Plastic Strap", now U.S. Pat. No. 4,906,320, the disclosure of which is incorporated herein by reference.

BACKGROUND OF THE INVENTION

1. Field of the Invention

The present invention relates to systems for applying and sealing plastic strap around an object, and in particular to systems for forming a heat-sealed joint between overlapping portions of the plastic strap.

2. Description of the Prior Art

A number of prior techniques have been used to heat seal two portions of plastic strapping. These techniques have included the insertion of a hot knife between the overlapped strap portions to melt the facing strap surfaces; melting the facing strap surfaces by friction; ultrasonic welding of the strap portions; dielectric welding of the strap portions; and the use of radiant energy absorption by an opaque layer on one of the strap portions to melt the facing strap surfaces. The present invention relates to this latter technique of radiant energy strap sealing.

The heat sealing of plastic straps by the use of radiant energy is disclosed in United Kingdom published application No. 2,103,147, and entails the use of plastic strapping which is a composite of a relatively thick translucent layer and a relatively thin opaque layer. The strap portions to be joined are overlapped and are pressed against the window of a tungsten-halogen lamp assembly so that the opaque layer of the lamp-side strap portion is in pressure contact with the other strap portion. The overlapping strap portions are then irradiated through the window with a high intensity transmission of radiant energy from the lamp, primarily in the visible wavelengths. This energy passes through the translucent layer of the lamp-side strap portion with little or no absorption, and is preferentially absorbed by the opaque layer, which melts and fuses to the other strap portion to form a heat-sealed joint therewith on cooling after the lamp has been switched off.

While this prior system forms an effective, high-strength joint between the strap portions, it has been found to have certain practical operating disadvantages as a result of the necessity of clamping the strap portions against the lamp window. This clamping is necessary in order to ensure firm, uniform contact between the overlapping strap portions and to ensure that the strap portions are held stationary during the melting and fusing of the opaque layer, lest uneven and imperfect joints result. But this clamping arrangement results in conduction of heat from the lamp window to the straps, since the lamp window is not perfectly transparent to radiant energy. The more rapid the operation of the sealing apparatus, the more heat is absorbed by the window. This retained heat is, in turn, conducted from the window to the adjacent strap portions in succeeding cycles. This tends to defeat one of the prime intended advantages of the radiant energy technique, i.e., the selective heating of only a thin opaque layer at the interface of the overlapping strap portions, without significant heat absorption by the remainder of the strap. Selective heating of only a thin surface layer substantially eliminates thermal degradation and resultant weakening of the remainder of the strap thickness. But conduction of heat from the window back into the strap tends to heat and thermally degrade the translucent portion of the strap.

Furthermore, the heat conducted into the strap from the window may be sufficient to reach the opaque layer and thereby effectively lower the heat contribution necessary from the lamp in order to attain optimal fusion of the strap portions. Thus, since the lamp is typically operated for a predetermined time period during each cycle, there will result overheating of the opaque layer and resultant heat conduction into and melting of the adjacent portions of the translucent layer. Indeed, it has been found that the lamp window may become so hot that it can start to melt the strap without any contribution at all from the lamp.

The aforementioned copending application Ser. No. 182,160, now U.S. Pat. No. 4,906,320, discloses a radiant energy heat sealing apparatus which avoids these disadvantages. However, that device requires that the loop of strap be tensioned about the object. Such a device would not be suitable in the many applications, such as baling applications, e.g., which do not require the loop to be under tension.

Additionally, the device of that copending application places the strap in very close proximity to the IR lamp during insertion of the strap into the device, thereby risking contact of the strap with the lamp and attendant damage or contamination of the IR lamps.

Finally, the device of that copending application requires the use of some type of physical separator between the overlapped strap portions in order to insure that only the supply portion of the strap will be cut during separation of the finished sealed loop from the supply portion of the strap. Such separators tend to make strap feed and removal more difficult and can act as a wedge to peel apart or compromise the formed joint.

SUMMARY OF THE INVENTION

It is a general object of the present invention to provide an improved radiant energy apparatus and method for forming high-strength seal joints between plastic strap portions, which avoids the disadvantages of prior radiant energy systems while affording additional structural and operating advantages.

An important feature of the invention is the provision of a relatively simple and economical radiant energy method of joining thermoplastic strap portions.

Another important feature of the invention is the provision of a method of the type set forth, which is energy efficient.

Still another feature of the invention is the provision of a method of the type set forth which provides precisely controllable localized melting of the adjoining strap portions and minimizes thermal conduction into the remainder of the strap.

In connection with the foregoing features, it is another feature of the invention to provide an apparatus for performing the methods of the type set forth.

Yet another feature of the invention is the provision of a method of the type set forth which requires only the portion of the strap in the joint area to be tensioned, and does not require that the entire strap be tensioned about the object being strapped.

It is another feature of the invention to provide a method of the type set forth in which the overlapped strap portions are brought in close proximity to the radiant energy source only during the sealing operation.

Another feature of the invention is the provision of a method of the type set forth wherein the strap is clamped on both sides of a sealing region by a mechanism which also provides a necessary separation to permit cutting of the finished joint from the supply portion of the strap.

In connection with the foregoing feature, a still further feature of the invention is the provision of apparatus of the type set forth which is portable and lightweight.

Certain ones of these features are attained by providing a method of forming a high-strength seal joint between two portions of plastic strap, each being formed of a radiant energy transmitting thermoplastic material and having substantially flat opposed surfaces, the method comprising the steps of: providing a radiant energy absorbing area on at least one of the surfaces of at least one of the strap portions, disposing the strap portions in overlapping relationship with each other at a sealing region in an initial configuration with the radiant energy absorbing area disposed at the interface between the strap portions, fixedly restraining one of the strap portions at spaced-apart locations disposed respectively adjacent to opposite ends of the sealing region, applying a force to the other one of the strap portions in a direction substantially normal to the surfaces thereof for urging the strap portions together and deflecting them from the initial configuration thereby to place the restrained strap portion under tension in the sealing region, exposing the radiant energy absorbing area to radiant energy by passing the radiant energy through the one strap portion for melting a region of the strap portions at the engaged surfaces thereof, and terminating the exposure of the radiant energy absorbing area to the radiant energy, thereby to form a joint between the urged-together portions of the strap upon cooling and resolidification of the melted region thereof.

Others of these features of the invention are attained by providing apparatus for forming a high-strength seal joint between two overlapped portions of plastic strap, each formed of radiant energy transmitting material, wherein at least one of the overlapped strap portions has a thermoplastic region including an area of radiant energy absorbing material disposed in facing relationship with the other overlapped strap portion in an initial configuration, the apparatus comprising: an anvil member having a bearing surface disposed adjacent to one of the overlapped strap portions at a sealing region, means for fixedly restraining the other one of the overlapped strap portions at spaced-apart locations disposed respectively adjacent to opposite ends of the sealing region, means for moving the bearing surface against the one strap portion for urging it against the restrained other strap portion and deflecting the urged-together strap portions from their initial configuration to a deflected configuration thereby to place the restrained strap portion under tension at the sealing region, a source of radiant energy, and means for directing radiant energy from the source through the restrained other one of the urged-together strap portions and onto the radiant energy absorbing area for heating the area and melting the adjacent thermoplastic region, whereby the overlapped strap portions are fused together for forming a joint therebetween upon cooling and resolidification of the melted thermoplastic region.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a rear perspective view of the sealing apparatus of the present invention, illustrating the actuator handles in their normal rest positions, with overlapped strap portions inserted in the apparatus;

FIG. 2 is a front perspective view of the sealing apparatus of FIG. 1;

FIG. 3 is an enlarged, fragmentary, perspective view of two overlapped portions of strap having an opaque layer on one surface of the strap, and illustrating a joint formed between the strap portions by means of the sealing apparatus of FIGS. 1 and 2;

FIG. 4 is a fragmentary, partially diagrammatic, front elevational view of the sealing apparatus of FIGS. 1 and 2 with the housing cover removed, and with the apparatus shown in position for sealing a strap wrapped around an associated object to be strapped;

FIG. 5 is front, perspective, exploded view of the tensioning assembly of the sealing apparatus of FIGS. 1 and 2;

FIG. 6 is a slightly enlarged, top plan view of the sealing apparatus of FIGS. 1 and 2, with the housing cover removed, and with the parts illustrated in their normal rest configuration;

FIG. 7 is a partially diagrammatic, rear elevational view of the sealing apparatus of FIGS. 1 and 2, as viewed from just inside the rear panel of the housing cover;

FIG. 8 is a fragmentary, view similar to FIG. 6, but with the structure in the upper part of the housing removed, more clearly to illustrate the clamping, tensioning and cutting assemblies;

FIG. 9 is a fragmentary, front elevational view of the clamping assembly of the present invention, illustrated in its normal release configuration;

FIG. 10 is a view similar to FIG. 9, with the parts illustrated in their clamping configuration;

FIG. 11 is a fragmentary front elevational view, in partial vertical section, of the tensioning and clamping assemblies of the present invention, illustrated in their normal release configurations;

FIG. 12 is a view similar to FIG. 11, with the parts illustrated in their clamping and tensioning configurations;

FIG. 13 is an enlarged, fragmentary, rear perspective view, partially exploded, of the cutting assembly of the present invention;

FIG. 14 is an enlarged, fragmentary view of a portion of FIG. 4, illustrating portions of the clamping, tensioning and cutting assemblies immediately after formation of the seal joint;

FIG. 15 is a fragmentary view in vertical section taken along the line 15—15 in FIG. 14; and FIG. 16 is a partially schematic and partially block diagram of a control circuit for controlling the operation of the sealing apparatus of FIGS. 1 and 2.

DESCRIPTION OF THE PREFERRED EMBODIMENT

Referring to FIGS. 1 and 2, there is illustrated a sealing apparatus, generally designated by the numeral 20, constructed in accordance with and embodying the features of the present invention. The sealing apparatus 20 is a portable device for heat-sealing together portions 22 and 24 of thermoplastic strapping, the portions 22 and 24 typically being supply and leading portions, respectively, of the same strap 25, although they could be portions of two separate straps. Referring to FIG. 3, each strap portion 22 and 24 has substantially parallel, flat, opposed upper and lower surfaces 26 and 27, respectively, and is formed of a radiant energy transmitting plastic material. More particularly, each of the strap portions 22 and 24 is substantially transparent or semi-transparent so as to be highly transmissive of radiant energy, particularly infrared energy. One of the surfaces 26 and 27 has a substantially opaque radiant energy absorbing area 28 thereon, the strap portions 22 and 24 being overlapped with the opaque area 28 of one of the strap portions disposed at the interface therebetween, as will be explained in greater detail below.

As illustrated in FIG. 3, the strap 25 has a clear thermoplastic strap body 29 which is highly transmissive of infrared radiant energy. The opaque area 28 is in the form of an opaque thermoplastic layer which is physically integral with the body 29 and may be formed thereon by coextrusion, chemical grafting, laminating, or the like. The body 29 and layer 28 may be formed of any suitable thermoplastic material, such as polyethylene, nylon, polypropylene, and the like, which exhibits sufficient tensile strength for use in strapping applications. In the orientation illustrated in the drawings, the layer 28 is disposed on the lower surface 27 of the strap 25.

It will be appreciated that the opaque area 28 could comprise an opaque marking formed on the surface 27 instead of a separate opaque plastic layer. Such a marking may be formed of an opaque ink or other suitable material which has sufficient opacity to be highly absorbent of infrared radiant energy, but the marking is applied in a very thin coating, so as not to interfere with the bonding action. The marking could be formed along the entire length of the strap or along only a limited-length portion thereof. In the latter case, there could be provided a suitable marking device (not shown), either on the apparatus 20 or adjacent thereto, for marking one of the strap portions 22 or 24 immediately before they are brought to overlapping relationship with each other.

The sealing apparatus 20 includes a generally box-like housing 30 which includes a flat, rectangular base plate 31 having an upper surface 32 in which are formed a large rectangular recess 33 and a smaller rectangular recess 34 (see FIG. 5). The housing 30 also includes a cover 35 which includes a flat rectangular top wall 36, integral at its perimeter with a front wall 37, opposed side walls 38 and a rear wall 39. The front wall 37 and the forward ends of the side walls 38 terminate a predetermined distance above the base plate 31 for cooperation therewith to define a rectangular slot 40 for receiving the strap 25, as will be explained more fully below. Secured to the top wall 36 is a handle 41 for carrying and positioning the sealing apparatus 20.

An ON/OFF power switch 42 (FIG. 1) is disposed on one of the side walls 38, while a trigger switch 43 is disposed on the top wall 36 adjacent to the handle 41. Also mounted on the top wall 36 are a lamp test button 44 and a lamp test light 45. A READY light 46 (preferably green), a WAIT light 47 (preferably yellow) and an OVERTEMPERATURE light 48 (preferably red) are also mounted on the top wall 36 adjacent to the handle 41. An AC power cord 49 extends through a complementary opening in one of the side walls 38. The cover 35 may be fixedly secured to the base plate 31 by suitable fasteners (not shown).

Referring now also to FIGS. 4, 6–10 and 14, the sealing apparatus 20 includes a clamping assembly 50 (FIG. 9) which includes two pairs 55 and 55A of grippers disposed on the upper surface 32 of the base plate 31, respectively along the opposite side edges of the large recess 33 (see FIG. 11). Each pair 55 and 55A of grippers extends from the front to the back of the base plate 31 and includes a lower gripper 51 having a serrated bottom surface 52 and a serrated top surface 53, each having beveled front edges, as at 54 (see FIG. 15), and an upper gripper 59 disposed immediately above the lower gripper 51 substantially congruent therewith, and having a serrated bottom surface 56 with a front edge beveled, as at 57. Each pair 55 and 55A of grippers is loosely secured to the base plate 31 at the rear ends thereof by a pin 58 (see FIG. 6), so that the pairs 55 and 55A of grippers normally rest on the upper surface 32 of the base plate 31, but are free to move vertically a limited distance.

The clamping assembly 50 also includes a rectangular cross bar 60 oriented vertically and having a pair of spaced-apart gripper notches 61 and 62 formed in the bottom edge thereof (see FIG. 9), for respectively freely accommodating the two pairs 55 and 55A of grippers so that the cross bar 60 rests upon the upper grippers 59. Also formed in the bottom edge of the cross bar 60 is an arcuate notch 63, for a purpose to be explained more fully below. Formed in the top edge of the cross bar 60 intermediate its ends is a rectangular cam follower notch 65, the bottom of which defines a flat, substantially horizontal, cam follower surface 66.

Referring also to FIGS. 5, 11 and 12, the sealing apparatus 20 further includes a tensioning assembly 70 which includes two generally L-shaped support members 71 and 71A, which are formed substantially as mirror images of each other. Each of the support members 71 and 71A includes a flat, rectangular base 72 having a flat planar upper surface 73, the bases 72 being respectively disposed in the large recess 33 in the base plate 31 adjacent to the opposite ends thereof, the bases 72 having a thickness such that the upper surfaces 73 thereof are disposed substantially coplanar with the upper surface 32 of the base plate 31. Integral with each base 72 at the rear end thereof is an upright portion 74 which is generally in the form of a rectangular block. The front surface of the upright portion 74 is cut away to define a horizontal shoulder 77 a slight distance above the base 72, the portion of the upright 73 below the shoulder 77 having substantially the same width as the base 72, and the portion above it being wider than the base 72, so as to project laterally inwardly therefrom to define an extension 75. A vertical groove 76 is formed at the rear inner corner of the upright 74, so that the rear portion of the upright 74 is substantially the same width as the base 72 along its entire height. The extension 75 has a flat, vertical, front surface 78. A mounting notch 79 is formed in the outer side edge of the upright 74 intermediate its upper and lower ends. Preferably, each of the support members 71 is fixedly secured to the base plate 31 by suitable fasteners (not shown) extending upwardly through the bottom of the recess 33.

The tensioning assembly 70 also includes a generally L-shaped anvil 80 (see FIG. 5) which has a generally horizontal base 81, which is adapted to be received in the recess 33 in the base plate 31 between the support members 71 and 71A. The base 81 has a convex, generally part-cylindrical, arcuate upper surface 82, so that the base 81 is thicker at its center than at its ends, the thickness of the base 81 at its longitudinal center being substantially the same as the depth of the recess 33. Integral with the base 81 at its rear end is a generally rectangular upright portion 83 having a pair of longitudinally spaced-apart vertical bores 84 extending therethrough for respectively slidably receiving therein a pair of pins 85 which are fixedly secured to the base plate 31 in the recess 33 by suitable means (not shown). Two vertical grooves 86 are respectively formed in the front surface of the upright portion 83 at the opposite ends thereof, the grooves 86 terminating a predetermined distance above the bottom surface of the anvil 80 to define shoulders 88. Formed front-to-back through the upright portion 84 just above the base 81 is a rectangular cam opening 87.

In assembly, the anvil 80 is first fitted down over the pins 85 and seated in the recess 33, it being appreciated that the anvil 80 is freely slidably movable vertically along the pins 85. The support members 71 are then mounted in place in the recess 33, with the extensions 75 and grooves 76 of the support members 71 and 71A respectively cooperating with the grooves 86 in the anvil 80 to form a sliding lap joint. The anvil 80 is adapted for sliding movement between a lower retracted or release position, illustrated in FIG. 11 and a tensioning position illustrated in FIG. 12.

The sealing apparatus 20 also includes a drive assembly 90 (FIG. 6) for controlling the operations of the clamping assembly 50 and the tensioning assembly 70. More specifically, the drive assembly 90 includes an elongated cam shaft 91 which is substantially circularly cylindrical and is mounted for rotation about its longitudinal axis by spaced-apart rear and forward mounting blocks 92 and 93 which are fixedly secured to the base plate 31. The cam shaft 91 extends forwardly through the cam follower notch 65 in the cross bar 60 (FIGS. 8-10). The portion of the cam shaft 91 which passes through the cam follower notch 65 has a flattened surface 94 thereon (FIG. 10) which is normally disposed in facing relationship with the cam follower surface 66 when the clamping assembly 50 is disposed in its normal release position, illustrated in FIG. 9. The part-cylindrical portion of the circumference of the cam shaft 91 defines a cam surface 95 (FIG. 10).

Fixedly secured to the cam shaft 91 just forwardly of the rear mounting block 92 is a stop member 96 (FIGS. 6 and 7) which has a pair of flat planar stop surfaces 96a and 96b disposed respectively for engagement with the upper surface 32 of the base plate 31 when the anvil 80 is disposed in its release and tensioning positions for preventing rotation of the cam shaft 91 beyond those positions.

Fixedly secured to the rear end of the cam shaft 91, just outside the rear wall 39 of the housing 30, is an elongated lever arm 97 (FIGS. 1 and 2). The forward end 98 of the cam shaft 91 has a square cross section (FIGS. 11 and 12) and is received through a complementary opening in a sector cam 100 which is disposed in the cam opening 87 in the anvil 80. The cam 100 may be fixedly secured to the cam shaft 91 by suitable means (not shown). The cam 100 has a pair of radial side surfaces 101 defining a predetermined acute angle therebetween, and subtending an arcuate surface 102.

In operation, when the clamping assembly 50 and the tensioning assembly 70 are respectively disposed in their normal release positions, illustrated in FIGS. 9 and 11, the lever arm 97 is disposed in the position illustrated in FIGS. 1 and 2. In order to operate the clamping assembly 50, the lever arm 97 is rotated in a clockwise direction, as viewed n FIG. 1, about the axis of the cam shaft 91. As the cam shaft 91 begins to rotate in the direction of the arrow in FIGS. 9 and 10, the arcuate cam surface 95 is brought into engagement with the cam follower surface 66, moving the cross bar 60 downwardly for firmly pressing the upper grippers 59 toward engagement with the lower grippers 51 and thereby pushing the lower grippers 51 toward engagement with the upper surface 32 of the base plate 31.

When the tensioning assembly 70 is in its normal release position, the arcuate surface 102 of the cam 100 is disposed as illustrated in FIG. 11 for allowing the anvil 80 to rest in its lowered release position. It will be noted that, in this position, there is substantial clearance between the upper radial surface 101 of the cam 100 and the upper edge of the cam opening 87 in the anvil 80. This provides a lost motion of the cam 100 during the initial rotation of the cam shaft 91 when the clamping assembly 50 is actuated to its clamping configuration, during which time there is no movement of the anvil 80. After the actuation of the clamping assembly 50 to its clamping configuration, the continued rotation of the cam shaft 91 by the lever arm 97 will bring the leading end of the arcuate surface 102 of the cam 100 into engagement with the upper edge of the cam opening 87 for driving the anvil 80 upwardly along the pins 85. The rotation of the lever arm 97 is stopped by engagement of the surface 86b of the stop member 86 with the upper surface 32 of the base plate 31, as described above.

Referring to FIGS. 2 and 4, mounted just inside the front wall 37 of the housing cover 35, above the anvil base 81, is an infrared lamp assembly 105, which may be substantially the same as that disclosed in the aforementioned copending application Ser. No. 182,160, wherefore the lamp assembly 105 is illustrated only diagrammatically herein. Preferably, the housing of the lamp assembly 105 is mounted against the bearing surfaces 78 of the support members 71 and 71A, being held in place by suitable fasteners (not shown) which extend through the notches 79 in the support members 71 and 71A. The lamp assembly 105 is positioned so that, when the anvil 80 is in its raised, tensioning position, illustrated in FIGS. 4 and 12, the strap portions resting on the anvil base 72 will be spaced a predetermined slight distance from the lamp assembly 105, as is best illustrated in FIG. 4. Mounted immediately above the lamp assembly 105 is a ventilation fan 107 (FIG. 6) for cooling purposes.

Referring now in particular to FIGS. 6, 8 and 11-14, the sealing apparatus 20 also includes a cutter assembly 110. The cutter assembly 110 includes an elongated shaft 111 disposed substantially parallel to the cam shaft 91 and being substantially square in transverse cross section at its rear end, which is supported for reciprocating sliding movement longitudinally of the shaft axis in a complementary opening in a mounting block 112, which is fixedly secured to the base plate 31. The forward end of the shaft 111 projects through the arcuate notch 63 in the cross bar 60 (see FIG. 13). The portion of the shaft 111 between the mounting block 112 and the cross bar 60 is encircled by a helical compression spring 116, the rear end of which bears against the mounting block 112 and the forward end of which bears against a roll pin 115 extending through the shaft 111 for resiliently urging the shaft 111 forwardly. The forward end of the shaft 111 has a reduced-diameter, circularly cylindrical portion 117, which is provided near its distal end with a notch 118 in which is fixedly secured a knife blade 119.

The rear end of the shaft 111 projects through a complementary opening in the rear wall 39 of the housing cover 35 and is secured outside the housing 30 to an elongated handle 120. More specifically, the shaft 111 is received in a complementary bore 121 in the handle 120 and is secured thereto for limited pivotal movement by a vertical coupling pin 122 (FIG. 6). The end of the handle 120 adjacent to the bore 121 defines a clevis 125 in which is received one end of a toggle link 126, and is pivotally coupled thereto by a pin 127 (FIG. 6). The other end of the toggle link is pivotally coupled to the upper surface 32 of the base plate 31 by a pin 128 (see FIG. 13). It will be appreciated that a suitable opening (not shown) is formed in the rear wall 39 of the housing cover 35 to accommodate the toggle link 126.

In operation, the knife blade 119 is normally disposed forwardly of the overlapped strap portions when they are mounted in the sealing apparatus 20, as will be explained more fully below. When it is desired to actuate the cutter assembly 110, the handle 120 is pulled rearwardly in the direction indicated by the arrow in FIG. 1, for pivoting the handle 120 about the axis of the pin 127, thereby reciprocating the shaft 118 rearwardly against the urging of the spring 116, drawing the cutting edge of the knife blade 119 rearwardly across the width of the strap portion to be severed, the toggle link 126 and the pivotal coupling accommodated by the coupling pin 122 permitting the necessary pivotal movement. When the handle 120 is released, the cutter assembly 110 returns to its normal rest position under the urging of the spring 116.

Referring now to FIG. 16, the sealing apparatus 20 includes a control circuit 130, which may be mounted on suitable circuit boards 131 and 132 (see FIGS. 6 and 7) within the housing 30. The AC power cord 49 is adapted to be plugged into an associated source of 120 VAC, 60 Hz power. The cord 49 includes conductors 133 and 134, one of which is connected through the ON-OFF power switch 42. A suitable power supply 136 is connected across the AC conductors 133 and 134 to produce a DC supply voltage which is, in turn, applied to a master controller 140, which may include a suitable integrated circuit microprocessor operating under stored program control. The master controller 140 is coupled to a cycle timer 137 which is, in turn, coupled to a manual-timer adjustment knob 138, which is preferably disposed inside the housing 30 and can be factory adjusted to set the maximum exposure time for the infrared radiant energy. The trigger switch 43 is also coupled to the master controller 140.

Also connected in series across the AC line are a solid state power relay 139, which may be mounted in the small recess 34 of the base plate 31, and the AC arms of a rectifying bridge 141, which may be a diode bridge. Connected in series across the DC arms of the bridge 141 are the series connection of a suitable current sensor 142 and the infrared lamp assembly 105, the current sensor 142 having an output connected to the master controller 140. Also connected to the master controller 140 are suitable indicators 143 and limit switches 144. It will be appreciated that the indicators 143 include the indicators 45–48, described above. Preferably, the fan 107 is connected across the AC line so that it runs whenever the sealing apparatus 20 is plugged in and the switch 42 is ON.

In operation of the sealing apparatus 20, a strap 25 is first wrapped around an object 145 to be strapped, and the base plate 31 of the sealing apparatus 20 is positioned on the object 145, as indicated in FIG. 4, with the clamping assembly 50, the tensioning assembly 70 and the cutter assembly 110 all disposed in their normal release positions, illustrated in FIG. 1. It will be understood that the power cord 49 is plugged in and the switch 42 is ON. The leading portion 24 of the strap 25 is inserted in the slot 40 between the upper surface 32 of the base plate 31 and the bottom surfaces 52 of the lower grippers 51, this insertion being facilitated by the beveled edges 54 on the bottom surfaces 52 of the lower grippers 51. The leading edge of the strap 25 is disposed a slight distance to the left of the left-hand pair 55 of grippers, as illustrated in FIG. 4. Then, the supply portion 22 of the strap 25 is fitted between the upper and lower grippers 59 and 51 of the clamping assembly 50, as illustrated in FIG. 4, this insertion being facilitated by the beveled edges 54 and 57 on the grippers 51 and 59, as illustrated in FIG. 15. The strap portions 22 and 24 are inserted until they stop against the upright portion of the anvil 80, so that the strap portions are disposed in overlapping relationship and in vertical alignment with each other. It will be appreciated that the leading portion 24 of the strap will be just tangent to the arcuate surface 82 of the anvil base 81 (see FIG. 11).

When the overlapping strap portions 22 and 24 are thus positioned in the slot 40, the operator moves the lever arm 97 in a clockwise direction, as viewed in FIG. 1, for actuating the clamping assembly 50 to its clamping configuration, illustrated in FIG. 10, to clamp the leading portion 24 of the strap between the base plate 31 and the lower grippers 51 and to clamp the supply portion 22 of the strap between the upper and lower grippers 59 and 51, as explained above.

The continued movement of the lever arm 97 actuates the tensioning assembly 70 to its tensioning configuration, illustrated in FIG. 12. More specifically, when the anvil 80 is lifted by the cam 100, the arcuate surface 82 of the anvil base 81 bears against the bottom surface of the leading portion 24 of the strap 25 in the sealing region between the pairs 55 and 55A of grippers of the clamping assembly 50. This urges the leading portion 24 of the strap into firm engagement with the overlapping supply portion 22 in the sealing region and continues to deflect both portions upwardly into an arcuate path spaced well above the base plate 31.

The serrated bottom and top surfaces 52 and 53 of the lower grippers 51 and bottom surfaces 56 of the upper grippers 59 firmly clamp the supply portion 22 and the leading portion 24 of the strap 25, permitting no slippage. Accordingly, when the supply portion 22 and leading portion 24 of the strap between the pairs of grippers of the clamping assembly 50 are deflected upwardly by the arcuate surface 82, they are placed under tension, serving to hold the supply portion 22 firmly in engagement with the underlying leading strap portion 24 which, in turn, is held firmly in engagement with the arcuate surface 82 of the anvil 80. The overlapping of the side edges of the anvil upright portion 83 by the rigid support members 71 and 71A prevent the anvil 80 from tilting forward under the force applied by the tensioned strap, and possibly bending the pins 85.

Preferably, upon movement of the tensioning assembly 70 to its tensioning configuration, the anvil 80 will actuate one of the limit switches 144 to cause the master controller 140 to activate the ready light 46 of the indicators 143 to inform the operator that the strap is ready for sealing. In this regard, it will be appreciated that the master controller 140 is supplied with DC power as soon as the sealing apparatus 20 is plugged in and the power switch 42 is turned on. In a constructional model of the invention, the lever arm 97 is rotated through about 120° from its normal release position to its tensioning position.

At this point, the operator actuates the trigger switch 43, which signals the master controller 140 to initiate a lamp energization cycle, the duration of which is controlled by the cycle timer 137. The master controller 140 is programmed so that, upon closure of the trigger switch 43, the solid state power relay 139 is switched to its closed condition for applying AC power to the rectifying bridge 141, thereby applying rectified AC power to the IR lamp assembly 105 for energizing it. The lamps are energized at full intensity, thereby emitting infrared radiant energy which is transmitted through the clear body of the upper strap portion 22 to the opaque area 28 thereon. Upon exposure of the opaque area 28 to the infrared energy, it absorbs the energy, heating the adjacent areas of the strap portions 22 and 24 contiguous thereto and melting them together so that they flow together and fuse.

The length of time that the infrared lamp assembly 105 is energized is controlled by the cycle timer 137 which is, in turn, set by adjustment of the manual adjustment knob 138. Typically, the lamps may be energized for approximately one second, after which the master controller 140 opens the power relay 139 and deenergizes the lamps, thereby terminating the exposure of the opaque area 28 to the infrared radiant energy. It has been found that this length of time is sufficient to melt the facing surfaces of the overlapping strap portions enough to form the joint, while limiting the depth to which the overlapping strap portions 22 and 24 are melted to a small fraction of the thickness thereof, thereby preventing thermal degradation of the strap portions 22 and 24 except near the interface therebetween. When the radiant energy has been turned off, the melted strap regions rapidly cool and resolidify in approximately four seconds, thereby forming a firm joint 150 (see FIG. 3) between the strap portions. In this regard, upon actuation of the trigger switch 43, the master controller 140 will actuate the wait light 47, which will remain lit until the lamp energization cycle is finished and the cooling period has elapsed, at which point the wait light 47 will be extinguished, indicating that the joint formation is complete.

At this point, the operator actuates the cutter assembly 110 by pulling back the handle 120, which acts as a second degree lever to sever the supply portion 22 of the strap 25 to separate the strap loop defined by the completed joint 150 from the strap supply. In this regard, the knife blade 119 is tilted at an angle so that it will engage only the upper or supply portion 22 of the strap, as is best indicated in FIG. 14. Because the supply portion 22 of the strap is still under tension, it is severed cleanly and with minimal effort. The angle on the knife blade 119 also provides a useful bevel on the cut strap end. More specifically, the exposed strap end on a packaged product encounters numerous external objects, such as conveyor rollers, uneven floors and storage surfaces, forklift blades, other packages and the like, all of which tend to catch on the exposed end and may peel back the strap, thus potentially compromising the seal. The taper on the cut end of the strap minimizes the chances of such deleterious effects by deflecting the strap end away from the impinging object and into engagement with the underlying strap portion. Preferably, the handle 120 is pivoted through an angle of about 30° in a horizontal plane from its normal rest position to its cutting position.

After the strap has been severed, the operator releases the formed seal joint 150 from the sealing apparatus 20 by rotating the lever arm 97 back to its initial position, thereby lowering the anvil 80 back to its normal release condition and releasing the clamping assembly 50 to permit the strap portions 22 and 24 to be easily removed therefrom. This movement is stopped by engagement of the surface 86a of the stop member 86 with the upper surface 32 of the base plate 81, as explained above.

Since the fan 107 is connected directly across the AC line, it runs all the time that the power switch 42 is closed, so as to prevent the buildup of heat in the apparatus 20. Preferably, a suitable temperature sensor (not shown) is provided in the sealing region so that if the temperature in that region builds up to an undesirable level, the sensor will cause the master controller 140 to actuate the OVER-TEMPERATURE light 48 to signal the operator. The current sensor 142 monitors the condition of the IR lamp assembly 105, the condition of which can be signaled by suitable ones of the indicators 143. While, in the described embodiment, the sealing apparatus of the present invention is manually operated, it will be appreciated that, if desired, the apparatus could be automated. More specifically, the tensioning and cutting mechanisms could be automated, as could the initiation and termination of the lamp cycle.

From the foregoing, it can be seen that there has been provided an improved portable and low-power radiant energy heat sealing apparatus which provides efficient and rapid seal formation in thermoplastic strap.

I claim:

1. Apparatus for forming a high-strength seal joint between two overlapped portions of plastic strap, each formed of radiant energy transmitting material, wherein at least one of the overlapped strap portions has a thermoplastic region including an area of radiant energy absorbing material disposed in facing relationship with the other overlapped strap portion in an initial configuration, said apparatus comprising: an anvil member having a bearing surface disposed adjacent to one of the overlapped strap portions at a sealing region, means for fixedly restraining the other one of the overlapped strap portions at spaced-apart locations disposed respectively adjacent to opposite ends of the sealing region, means for moving the bearing surface against the one strap portion for urging it against the restrained other strap portion and deflecting the urged-together strap portions from their initial configuration to a deflected configuration thereby to place the restrained strap portion under tension at the sealing region, a source of radiant energy, and means spaced from the overlapped strap portions for directing radiant energy from said source through the restrained other one of the urged-together strap portions and onto the radiant energy absorbing area for heating the area and melting the adjacent thermoplastic region, said means for directing not contacting the urged together strap portions at the sealing region, whereby the overlapped strap portions are fused together without clamping for forming a joint therebetween upon cooling and resolidification of the melted thermoplastic region.

2. The apparatus of claim 1, wherein said bearing surface is arcuate in shape so that the urged-together strap portions in their deflected configuration are disposed in an arcuate path.

3. The apparatus of claim 1, and further comprising manually operable means for effecting movement of said anvil member.

4. The apparatus of claim 3, wherein said manually operable means includes cam means rotatably movable into camming engagement with said anvil member for effecting movement thereof, and lever means coupled to said cam means for effecting rotation thereof.

5. The apparatus of claim 4, wherein said cam means includes an elongated shaft rotatable about its longitudinal axis, a cam member fixedly secured to said shaft at one end thereof and having a cam surface, said lever means being coupled to said shaft adjacent to the other end thereof, said anvil member having a cam follower surface disposed for engagement with said cam surface in response to rotation of said cam for effecting movement of said anvil member.

6. The apparatus of claim 1, wherein said anvil member is generally L-shaped and includes a bearing portion disposed for engagement with the one strap portion and a drive portion disposed substantially perpendicular to said bearing portion, said apparatus further comprising drive means coupled to said drive portion for effecting movement of said anvil member.

7. The apparatus of claim 6, wherein said drive portion has a cam opening formed therein defining a cam follower surface, said drive means including a rotatable cam disposed in said cam opening and having a cam surface disposed for engagement with said cam follower surface, said apparatus further comprising guide means for guiding the movement of said anvil member.

8. The apparatus of claim 1, and further comprising cutter means for severing the restrained other portion of the strap from a supply portion thereof after formation of the joint.

9. The apparatus of claim 8, wherein said cutter means includes an elongated shaft and a cutter carried by said shaft adjacent to one end thereof, and handle means coupled to said shaft adjacent to the other end thereof for effecting reciprocating movement thereof substantially parallel to the plane of the strap and perpendicular to the longitudinal axis thereof for effecting cutting movement of said cutter blade.

10. The apparatus of claim 8, wherein said cutter means is disposed for forming a beveled edge on the cut end of the strap.

11. The apparatus of claim 1, wherein the parts are constructed and arranged so that when the overlapped strap portions are in their deflected configuration the region of the restrained strap portion through which the radiant energy is directed is out of contact with any structure.

12. Apparatus for forming a high-strength seal joint between two overlapped portions of plastic strap each formed of radiant energy transmitting material, wherein at least one of the overlapped strap portions has a thermoplastic region including an area of radiant energy absorbing material disposed in facing relationship with the other overlapped strap portion in an initial configuration, said apparatus comprising: a source of radiant energy, an anvil member defining an arcuate surface disposed adjacent to one of the overlapped strap portions at a sealing region, first and second gripping means at spaced-apart locations respectively disposed adjacent to opposite ends of the sealing region, each of said first and second gripping means being movable between a release condition accommodating free movement of the overlapped strap portions and a gripping condition gripping and fixedly restraining at least the other one of the overlapped strap portions, said arcuate surface being movable in directions substantially normal to the overlapped strap portions between a retracted position accommodating the overlapped strap portions in their initial configuration and a deflecting position urging the overlapped strap portions against each other and deflecting them from their initial configuration into an arcuate path, actuating means coupled to said anvil member and to said first and second gripping means and operable for sequentially moving said first and second gripping means to their gripping conditions and then moving said arcuate surface to its deflecting position thereby to place the restrained other strap portion under tension at the sealing region, and means spaced from the overlapped strap portions for directing radiant energy from said source through the restrained other one of the urged-together strap portions and onto the radiant energy absorbing area for heating the area and melting the adjacent thermoplastic region, said means for directing not contacting the urged together strap portions at the sealing region, whereby the overlapped strap portions are fused together without clamping for forming a joint therebetween upon cooling and resolidification of the melted thermoplastic region.

13. The apparatus of claim 12, wherein said apparatus includes a base plate, each of said first and second gripping means including upper and lower gripping members disposed in overlapping relationship with each other and with said base plate and movable in directions substantially perpendicular to said base plate, the one strap portion being disposed in use between said base plate and said lower gripper members and the other strap portion being disposed in use between said upper and lower gripper members, and drive means for effecting movement of said upper and lower gripper members between a release condition freely accommodating movement of the strap portions with respect thereto and a gripping condition gripping the one strap portion between the base plate and the lower gripper members and gripping the other strap portion between the upper and lower gripper members.

14. The apparatus of claim 13, wherein at least the facing surfaces of said upper and lower gripper members are serrated for secure gripping engagement with the other strap portion to prevent slippage thereof upon deflection by said anvil member.

15. The apparatus of claim 13, wherein said drive means includes a cross bar spanning said first and second gripping means and movable into engagement with said upper gripper members thereof for moving said upper and lower gripper members to the gripping conditions thereof.

16. The apparatus of claim 15, wherein said cross bar has a cam follower surface, said drive means further including a rotatable cam member having a cam surface, and means for effecting rotation of said cam member for moving said cam surface into camming engagement with said cam follower surface for effecting movement of said cross bar.

17. The apparatus of claim 12, wherein said actuating means is manually operable.

18. The apparatus of claim 17, wherein said actuating means includes first cam means for effecting movement of said anvil member and second cam means for effecting movement of said first and second gripping means.

19. A method of forming a high-strength seal joint between two portions of plastic strap, each being formed of a radiant energy transmitting thermoplastic material and having substantially flat opposed surfaces, the method comprising the steps of: providing a radiant energy absorbing area on at least one of the surfaces of at least one of the strap portions, disposing the strap portions in overlapping relationship with each other at a sealing region in an initial configuration with the radiant energy absorbing area disposed at the interface between the strap portions, fixedly restraining one of the strap portions at spaced-apart locations disposed respectively adjacent to opposite ends of the sealing region, applying a force to the other one of the strap portions in a direction substantially normal to the surfaces thereof for urging the strap portions together and deflecting both of the strap portions from the initial configuration while maintaining the restrained one strap portion free from contact with any other structure at the sealing region thereby to place the restrained strap portion under tension in the sealing region, exposing the radiant energy absorbing area to radiant energy at the sealing region by passing the radiant energy through the one strap portion for melting a region of the strap portions at the engaged surfaces thereof, and terminating the exposure of the radiant energy absorbing area to the radiant energy, thereby to fuse together the overlapped strap portions for forming a joint therebetween without clamping upon cooling and resolidification of the melted region thereof.

20. The method of claim 19, wherein the restraining step comprises clamping the one strap portion at the spaced-apart locations.

21. The method of claim 20, and further comprising the step of fixedly restraining the other strap portion at the spaced-apart locations.

22. The method of claim 19, and further comprising the step of severing the one strap portion from a supply portion thereof after formation of the joint, and then releasing the strap portions.

23. The method of claim 19, wherein the strap portions are deflected from their initial configuration into an arcuate path.

24. A method of forming a high-strength seal joint between two portions of plastic strap, each being formed of a radiant energy transmitting thermoplastic material and having substantially flat opposed surfaces, the method comprising the steps of: providing a radiant energy absorbing area on at least one of the surfaces of at least one of the strap portions, disposing the strap portions in overlapping relationship with each other at a sealing region with the radiant energy absorbing area disposed at the interface between the strap portions, exposing the radiant energy absorbing area to radiant energy at the sealing region by passing the radiant energy through one of the strap portions for melting a region of the strap portions at the engaged surfaces thereof, urging the overlapped strap portions against each other and restraining them against movement during irradiation while maintaining the strap portion through which the radiant energy enters free from contact with any other structure at the sealing region, and terminating the exposure of the radiate energy absorbing area to the radiant energy, thereby to fuse together the overlapped strap portions for forming a joint therebetween without clamping upon cooling and resolidification of the melted region thereof.

* * * * *